(12) United States Patent
Murasawa

(10) Patent No.: US 8,817,326 B2
(45) Date of Patent: Aug. 26, 2014

(54) IMAGE PROCESSING APPARATUS

(75) Inventor: Kouta Murasawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 637 days.

(21) Appl. No.: 12/964,245

(22) Filed: Dec. 9, 2010

(65) Prior Publication Data

US 2011/0289504 A1 Nov. 24, 2011

(30) Foreign Application Priority Data

May 24, 2010 (JP) ................. 2010-118772

(51) Int. Cl.
  *H04N 1/60* (2006.01)
  *G06F 9/48* (2006.01)
  *G06F 9/50* (2006.01)
  *G06F 3/12* (2006.01)

(52) U.S. Cl.
  CPC ............ *G06F 9/4843* (2013.01); *G06F 9/5038* (2013.01)
  USPC ............... 358/1.9; 358/1.13; 358/1.15

(58) Field of Classification Search
  None
  See application file for complete search history.

(56) References Cited

U.S. PATENT DOCUMENTS 5,659,747 A 8/1997 Nakajima ............ 395/651
2009/0161985 A1* 6/2009 Kotani .................. 382/275

FOREIGN PATENT DOCUMENTS

JP 2004-264945 A 9/2004
JP 2005-310116 11/2005

* cited by examiner

*Primary Examiner* — Dov Popovici
(74) *Attorney, Agent, or Firm* — Fitzpatrick, Cella, Harper & Scinto

(57) ABSTRACT

When a user inputs an image addition instruction from a UI input unit, a job registration unit registers a job corresponding to the instruction in a job list for each type of processing. When undo is input from the UI input unit, a current position pointer prepared for each type of processing returns to the immediately preceding job. When redo is input, the current position pointer moves to the immediately succeeding job. When a processing execution instruction is input, out of jobs registered in the job list, the job indicated by the current position pointer and preceding jobs are executed in a predetermined order.

6 Claims, 12 Drawing Sheets

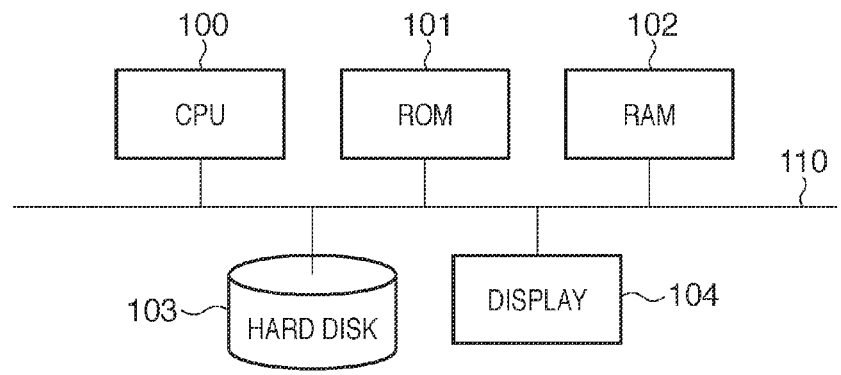
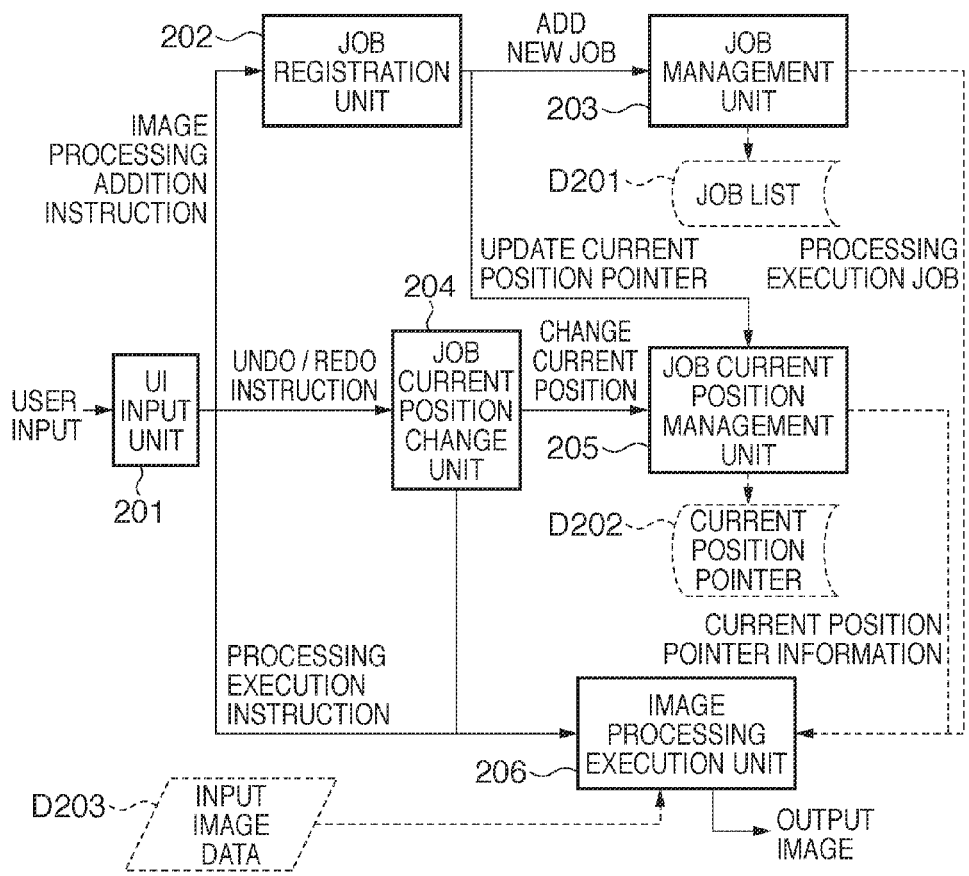

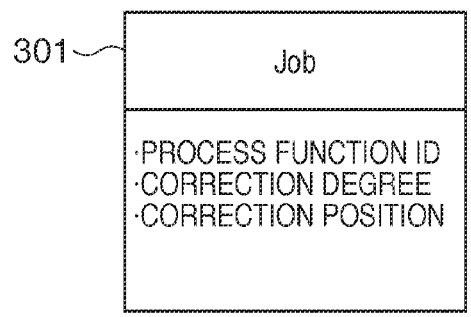
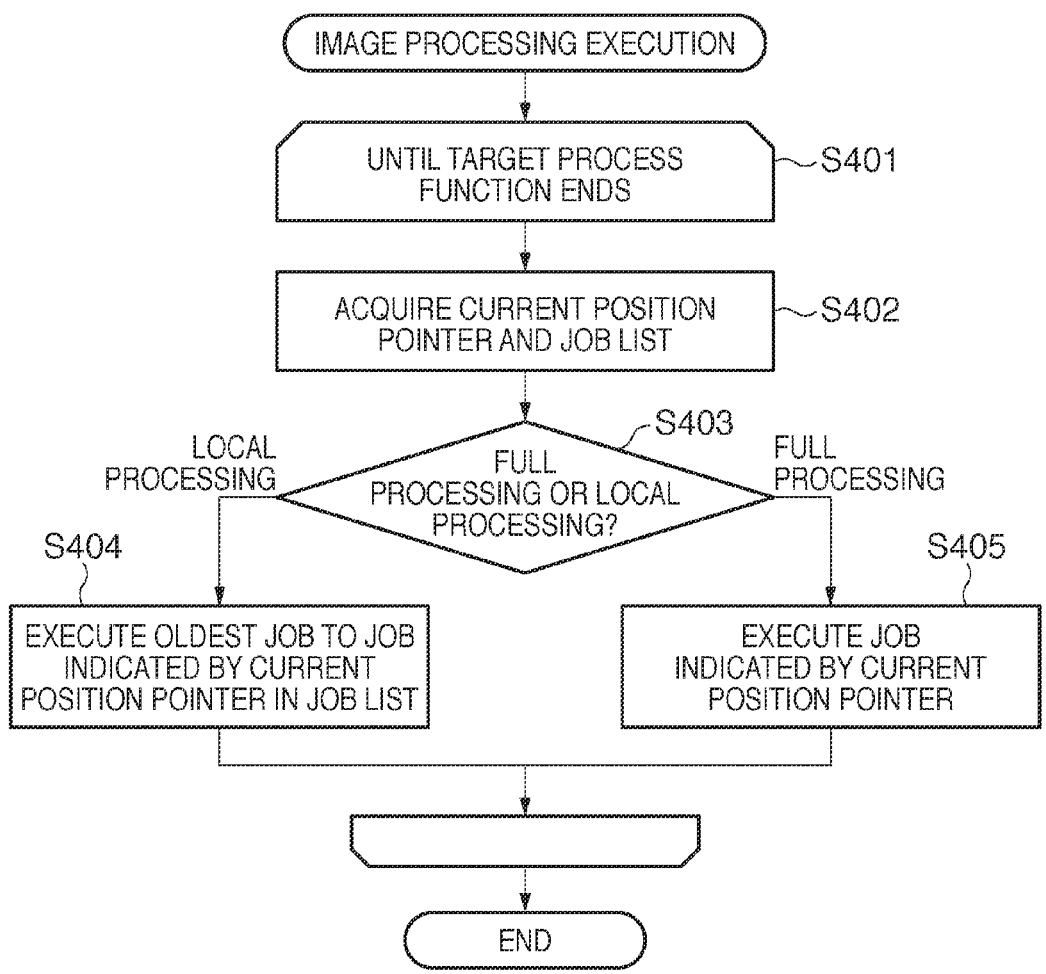

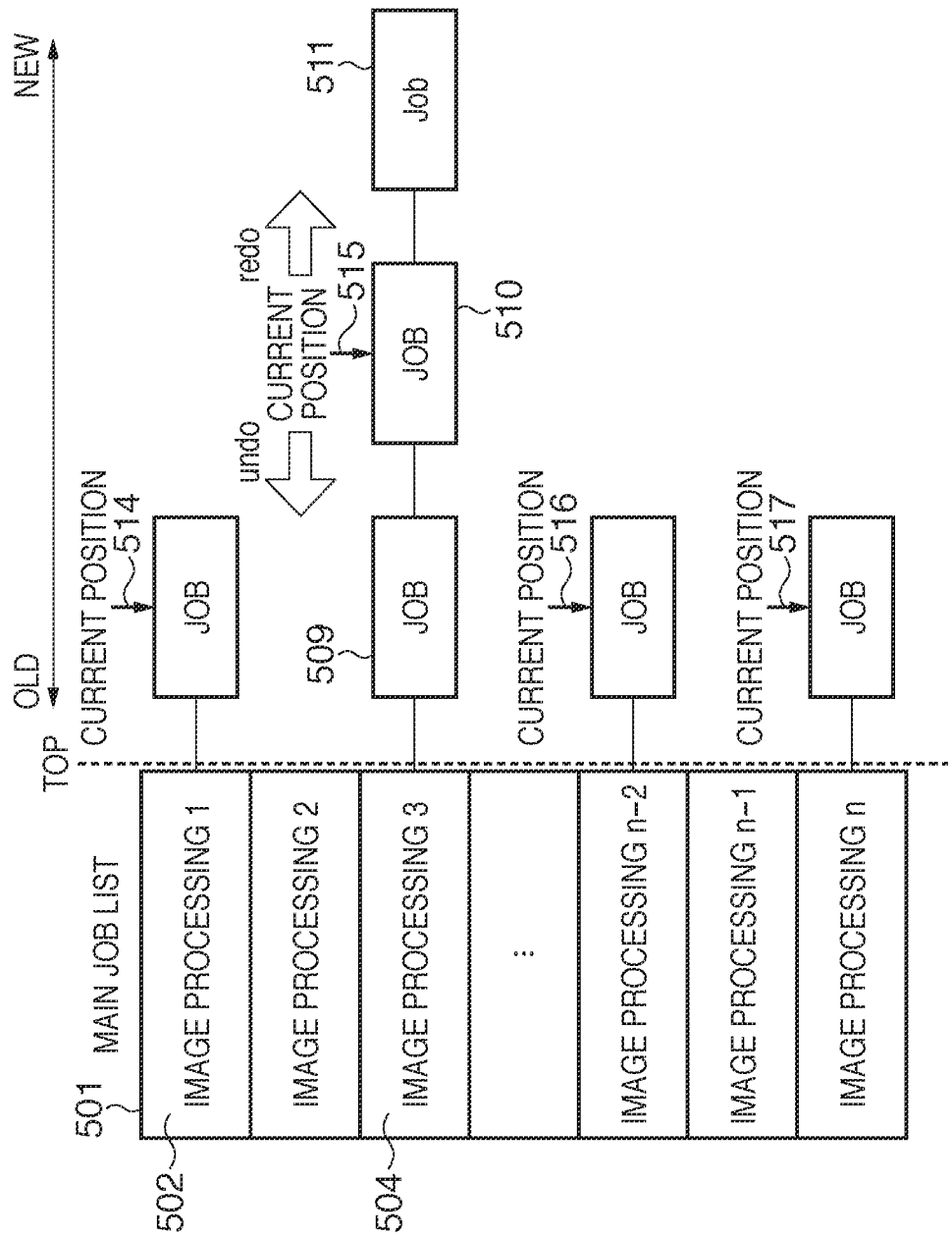

IMAGE PROCESSING APPARATUS

BACKGROUND OF THE INVENTION

1. Field of the Invention

The present invention relates to an image processing apparatus for processing an image based on, for example, a user operation.

2. Description of the Related Art

Recently, using image data to correct or adjust captured image data using a photo retouch application for retouching or correcting an image, and then printing the image data or uploading it to the Web for sharing or public consumption has become popular.

The photo retouch application provides basic correction and adjustment functions of, for example, adjusting the angle of view, brightness, and tint of captured image data. There also exist applications that have a function to analyze image data and automatically correct it as well as the above-described functions. Note that correction, adjustment, retouching, and the like of image data will simply be referred to as processes or image processing.

Some photo retouch applications have an undo function of undoing correction that has been done once or a redo function of redoing an operation that has been undone once (for example, Japanese Patent Laid-Open No. 2005-310116). The conventional undo/redo function will be explained with reference to FIGS. 13 and 14.

Referring to FIG. 14, process histories 1401 to 1408 indicate examples of process histories recorded by operating a photo retouch application. A process history includes, for example, the order, contents, and parameters of applied processes. The process 1401 is one process unit of image processing executed by pressing a button U1304 or U1305 or moving a slider U1306 on the example of a UI U1301 shown in FIG. 13. In FIG. 14, when image processing is executed in the order of, for example, automatic photo correction, red-eye correction A, red-eye correction B, flesh color correction, and brightness adjustment, the processes remain as histories like the processes 1401 to 1405.

If the user wants to change the already executed red-eye correction B 1403 in this state, a conventional application causes the user to press, for example, an undo button U1302 displayed on the user interface to cancel the brightness adjustment 1405, flesh color correction 1404, and red-eye correction B 1403. After that, the user redoes red-eye correction by, for example, changing the parameter and then performs flesh color correction and brightness adjustment again. If change of the parameter is not required after all, the user may press the "redo" button U1303 to redo the last undone function. This leaves the process histories of the red-eye correction B' 1406, flesh color correction 1407, and brightness adjustment 1408. As described above, the undo/redo function is conventionally implemented by retroactively tracing the process histories of a series of operations from the latest operation to the past.

To cancel one process out of many kinds of image processing sequentially applied to an image or redo the process using a changed parameter, it is necessary to use the undo function to go back to the state immediately before the target process is applied to the image. The user needs to redo or cancel the target process in that state and then redo subsequent correction that has already been done.

This requires complex operations of the user. In recent years, the problem is becoming more serious because of the increase in the correction functions of photo retouch applications. This applies not only to a photo retouch application but also to an undo/redo function prepared in an application for processing target data by successively applying many functions such as correction.

SUMMARY OF THE INVENTION

The present invention has been made in consideration of the above-described problem, and proposes an image processing apparatus and method for providing an undo/redo function which allows a user to more simply and more intuitively perform an operation.

The present invention has the following arrangement.

According to an aspect of the present invention, an image processing apparatus comprises: an input unit configured to input process information representing image processing for an input image; a registration unit configured to register the process information, input by the input unit, in a list for each type of processing as a job corresponding to one input; a specifying unit configured to specify, as a job of interest for each type of processing, one of jobs registered in the list by the registration unit, in accordance with a user operation; and a processing execution unit configured to execute, out of the jobs registered in the list, the job of interest and preceding jobs for the input image in accordance with a job execution instruction in an order predetermined for each type if the jobs are of different types of processing or in a listed order for each type of processing, wherein the registration unit registers a new job in the list as a job next to the job of interest, and the specifying unit specifies the new job as the job of interest in accordance with registration of the new job.

With the above-described arrangement, the user can selectively designate undo for a target function and thus quickly and intuitively perform a simple operation to cancel or redo a function already executed for target data.

Further features of the present invention will become apparent from the following description of exemplary embodiments with reference to the attached drawings.

BRIEF DESCRIPTION OF THE DRAWINGS

FIG. 1 is a block diagram showing a hardware configuration capable of executing the present invention;

FIG. 2 is a block diagram of processing according to the first embodiment;

FIG. 3 is a view showing an example of contents of a job;

FIG. 4 is a flowchart of image processing execution according to the first embodiment;

FIG. 5 is a view for explaining an example of job management and an example of current position management according to the first embodiment;

DESCRIPTION OF THE EMBODIMENTS

First Embodiment

The preferred first embodiment of the present invention will be described. This embodiment is merely an example, and the present invention is not limited to the following embodiment.

This embodiment assumes an image processing application in which the order of UI operations does not depend on the image processing result. That is, instructing automatic photo correction first and RGB adjustment then and instructing RGB adjustment first and automatic photo correction then yield the same result. This is because the process execution order is predetermined regardless of the designated order. There are restrictions that, for example, automatic correction is always performed first, and other correction processes are performed for the automatically corrected image, and no double execution of automatic correction is allowed. Such image processing is implemented by the following embodiment.

<Description of Hardware Configuration>

FIG. 1 is a block diagram for explaining an example of the hardware configuration of an information processing apparatus according to the first embodiment. Referring to FIG. 1, a CPU (Central Processing Unit) 100 executes an information processing method to be described in this embodiment in accordance with programs. A ROM 101 stores the programs to be executed by the CPU 100. A RAM 102 provides a memory to temporarily store various kinds of information when the CPU 100 executes the programs. A hard disk 103 is a storage medium configured to store image files, parameters for pattern identification, and the like. A display 104 is a device which presents a processing result of the embodiment to the user. A control bus/data bus 110 connects the above-described units to the CPU 100. In addition, a communication interface and an image input device to input image data are connected, although not illustrated. Process target image data is input from, for example, a digital camera or an image scanner or acquired from another computer via a network.

<Addition of Process Function>

FIG. 2 is a block diagram of an image processing application program according to the embodiment. The procedure of processing will be described with reference to the block diagram. Process target image data is input and stored in the hard disk 103. The process target image data will be referred to as original image data. The original image data is stored without being changed even after image processing. Processed image data is stored separately from the original image data. Image processing such as correction for the original image data is implemented in accordance with the following procedure.

Figure 6:
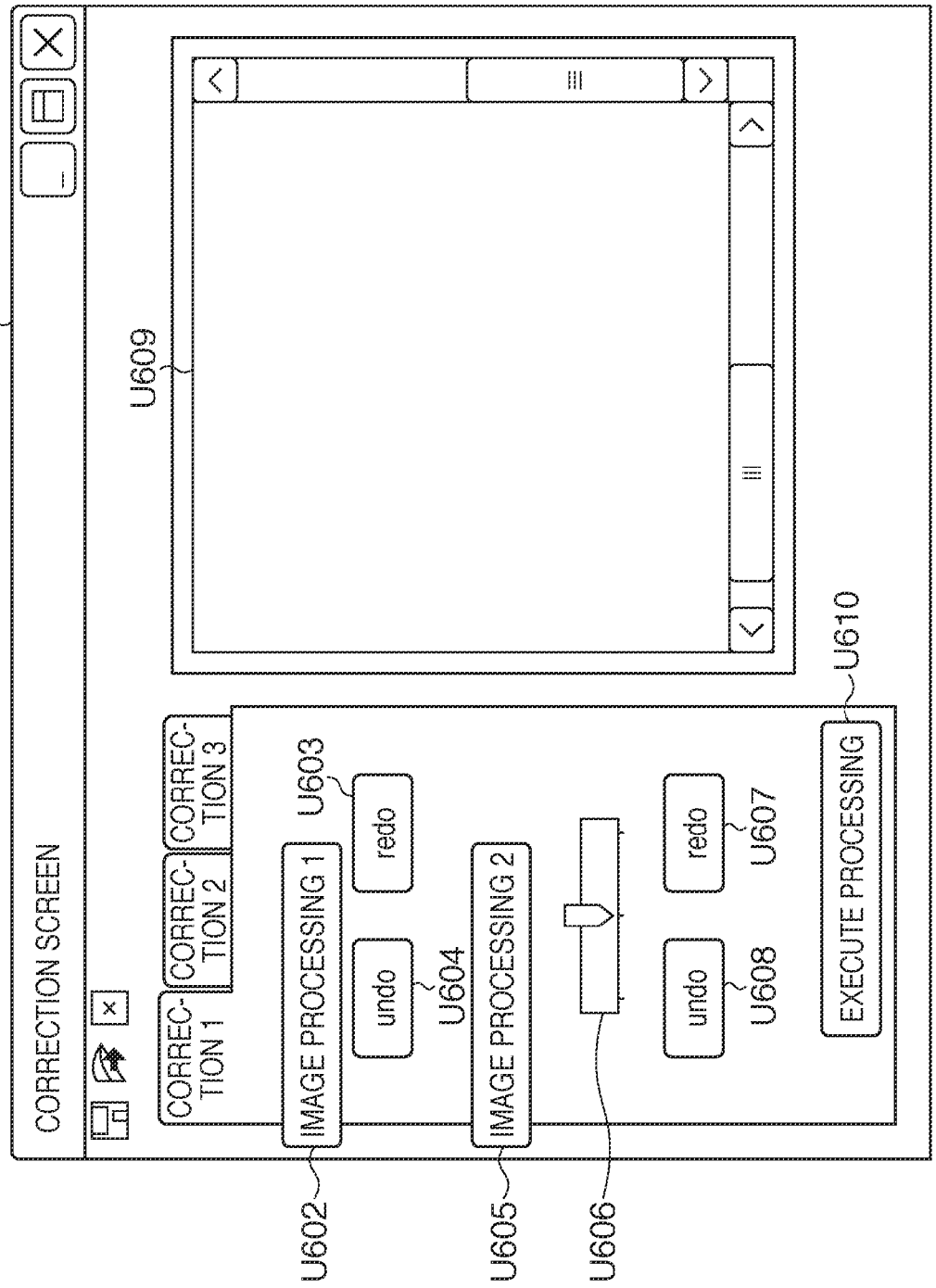
FIG. 6 is a view showing an example of a UI configured to instruct undo/redo and job addition according to the first embodiment.

The application accepts input of a user's correction instruction from a UI input unit 201. There exist at least three kinds of input: an image processing addition instruction, undo/redo instruction, and processing execution instruction. The UI input unit 201 is implemented by a user interface screen U601 with a preview window U609 as shown in FIG. 6. The image processing addition instruction can be input by, for example, pressing an image processing button U602 or U605 or moving a slider U606 on a user interface screen 601 shown in FIG. 6. For example, the image processing buttons instruct automatic photo correction and the like, and the slider instructs to adjust the brightness or contrast. The image processing addition instruction is sent to a job registration unit 202. Upon receiving the image processing addition instruction, the job registration unit 202 generates a new job and sends it to a job management unit 203 to register the job. A job indicates process information of certain correction processing. For example, a job is data that packages a process function ID and parameters such as the intensity and correction position, as shown in the job 301 in FIG. 3. In this embodiment, one job holds process information of one process function. However, one job may hold process information of two or more process functions.

The job management unit 203 manages jobs in a job list D201 as a two-dimensional array linked to each process function, as in a main job list 501 shown in FIG. 5. The jobs are time-serially linked for each process function. The job management unit 203 specifies the process function to which the input new job belongs by referring to the process function ID of the job, and stores the job in a function-specific job list in association with the specified process function.

A job list indicates a mechanism for managing jobs. The main job list includes function-specific job lists. Each function-specific job list, for example, connects jobs of the same function as a bidirectional list so as to times-serially manage the jobs by placing an old one close to the top and a new one far from the top. This is merely an example, and an arbitrary management method is applicable. Each job list needs to have a data structure capable of specifying jobs before and after a given job and discriminating old and new jobs.

The newly added job is linked to the position next to the current position pointer of the function-specific job list. "Next" indicates a "next newer job", and the opposite is "preceding". That is, when adding a new job, a new link is formed in accordance with the link mechanism of the job list. For example, in this embodiment, the job list is a bidirectional list in which each job is linked by a bidirectional pointer that indicates the preceding and succeeding jobs. In this case, the pointer of the job specified by the current position pointer is rewritten to a value representing the newly added job. In addition, the pointer of the newly added job is rewritten to a value representing the job specified by the current position pointer. Accordingly, if a next job is linked to the job indicated by the current position pointer, the linked job and following jobs are removed and deleted from the job list. That is, the linked job and following jobs are replaced with the new job. No job exists before the job at the top. Instead, the pointer indicates an address or the like set for the function of each function-specific job list. Conversely, no job exists next to the job at the end. Hence, the pointer indicating the next job stores a value representing that the job is at the end. Note that the job specified by the current position pointer will also be referred to as a job of interest.

At the same time the job list is operated, the job registration unit 202 sends a current position pointer update instruction to a job current position management unit 205 to update the current position pointer D202. The job current position management unit 205 manages the current position pointer of each function-specific job list, like current positions 514 to 517 in FIG. 5. The job indicated by the current position pointer is changed based on the current position pointer update instruction. When a new job is added, the current position pointer is updated to indicate the new job.

The current position pointer is a pointer indicating the job position in the function-specific job list. For example, the current position pointer is a pointer having the address of the job. This is merely an example, and the current position pointer may indicate the job itself or have an ID capable of identifying the job. Alternatively, the current position pointer may hold the number of times of undo/redo. That is, the current position pointer is information to uniquely specify the job. If no job is registered in the job list, information representing it is recorded. Note that the initial position of the current position pointer may indicate an arbitrary job or need not indicate a job. Alternatively, a specific job, for example, the latest job may be indicated. New image processing can be added in accordance with the above-described procedure.

<Undo/Redo Function>

The undo/redo instruction can be input from the UI input unit 201 when the user presses an undo button U604 or U608 or a redo button U603 or U607 in FIG. 6 to perform an undo or redo operation.

The undo/redo instruction is sent to a job current position change unit 204. Upon receiving the undo/redo instruction, the job current position change unit 204 sends a current position change instruction to the job current position management unit 205. Upon receiving the current position change instruction, the job current position management unit 205 changes the target of the current position pointer to another job based on the change instruction.

An example of how to change will be explained using a function-specific job list 504 concerning image processing 3 in FIG. 5. The current position pointer indicates a job 510. In this case, if the current position change instruction is for redo, the current position pointer is changed to indicate an immediately succeeding job 511. On the other hand, if the current position change instruction is for undo, the current position pointer is changed to indicate an immediately preceding job 509. If no job is present at the change destination, the current position pointer is not changed. Note that this is merely an example of change. Changing the current position pointer may be done not by shifting the job position one by one but by moving a designated number of jobs. Instead of shifting by the number of jobs, the pointer may be moved to a designated job. Obviously, the current position pointer is operated in accordance with its form (for example, job address or the number of jobs).

The current position change instruction can be applied to the job lists of all designated process functions. In this case, the current position pointer of each target function-specific job list is moved in accordance with undo or redo.

A new job can be added after the current position pointer has been moved by undo/redo. In this case, the new job is linked next to the job specified by the current position pointer (that is, on the new side), and existing jobs are deleted from the job list, as described above.

<Execution of Image Processing>

The processing execution instruction is input from the UI input unit 201 when the user presses a processing execution button U610 in FIG. 6. Alternatively, the processing execution instruction is issued following addition of a new job to the job list upon pressing the image processing button U602 or U605. Otherwise, the processing execution instruction may be issued upon pressing the undo button U604 or U608 or the redo button U603 or U607. The processing execution instruction may be issued not upon pressing the undo button U604 or U608 or the redo button U603 or U607 but after image processing is added then. In this case, processing is not executed only by pressing the undo button U604 or U608 or the redo button U603 or U607. Hence, the user who wants to execute image processing immediately after undo/redo needs to press the processing execution button U610.

The processing execution instruction is sent to an image processing execution unit 206. The image processing execution unit 206 executes image processing for the input image data D203 based on a processing execution job received from the job management unit 203 and current position pointer information received from the job current position management unit 205.

A detailed processing procedure will be described with reference to FIG. 4. The procedure in FIG. 4 is executed by the image processing execution unit 206 in the functional block and by the CPU 100 in the hardware configuration. Since initial process target image data is input original image data, the original image data is duplicated and stored in the area of process target image data before executing image processing.

In step S401, focus is placed on an execution target process function. As described above, in this embodiment, the execution order of process functions is predetermined. For example, focus is placed on functions sequentially in the order of functions arranged in the job list 501 (in FIG. 5, for example, sequentially from the upper function). First, focus is placed on "image processing 1" 502 at the top in FIG. 5. In step S402, the current position pointer and function-specific job list of the process function of interest are referred to from the job management unit 203 and the job current position management unit 205. In step S403, it is determined whether the process function of interest is full processing or local processing. For full processing, the process advances to step S405 to execute only the job indicated by the current position pointer. For local processing, the process advances to step S404 to execute the oldest job in the job list up to the job indicated by the current position pointer. The image data to be processed by the executed process function is the process target image data stored before the procedure in FIG. 4. The process target image data is overwritten by the processed image data after execution of the processing.

Note that full processing means image processing such as brightness adjustment or contrast adjustment to be applied to the entire image, that is, image processing that affects the entire image. Local processing means image processing such as red-eye correction or mole removal to be applied to part of the image. Which processing corresponds to the job to be executed, full processing or local processing, can be determined in advance for each process function and stored in, for example, a table format. The determination in step S403 can be done by looking up the table.

Since the job of full processing overwrites the entire image, processing the oldest job to the job immediately before the job indicated by the current position pointer is wasteful. Instead, the job indicated by the current position pointer is executed in step S405. To the contrary, local processing may be performed for a different process target portion. Hence, the oldest job to the job indicated by the current position pointer in the job list are executed. Branching the processing of the embodiment based on whether the job is full processing or local processing provides the effect of saving the process time. Conversely speaking, the oldest job to the job indicated by the current position pointer in the job list may be executed for all jobs without making the determination in step S403. Though this prolongs the process time, the type of job need not be determined.

Steps S402 to S405 described above are executed up to the final process function registered in the job list 501 while sequentially placing focus on the process functions. Note that in this embodiment, all image processes registered in the job list are re-executed in a predetermined order in accordance with the image processing execution instruction. Instead, the processes may be executed while placing focus on only the newly added job or only the process function to which the current position pointer has been changed.

As described above, in this embodiment, an image processing function is handled as a job, and jobs are managed in a function-specific job list for each process function. This makes it possible to implement undo/redo for each process function and improve the undo/redo operability of the user.

Figure 13:
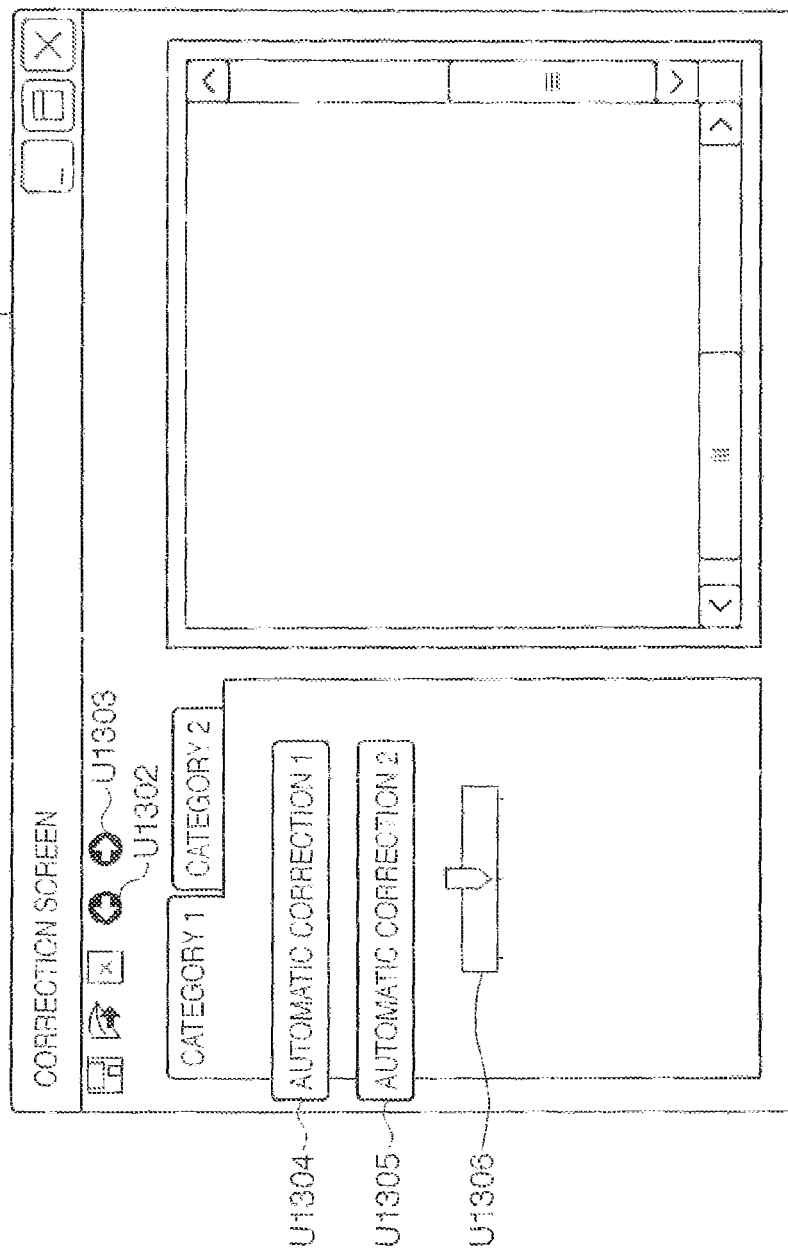
FIG. 13 is a view showing an example of a conventional image processing application UI.
Figure 14:
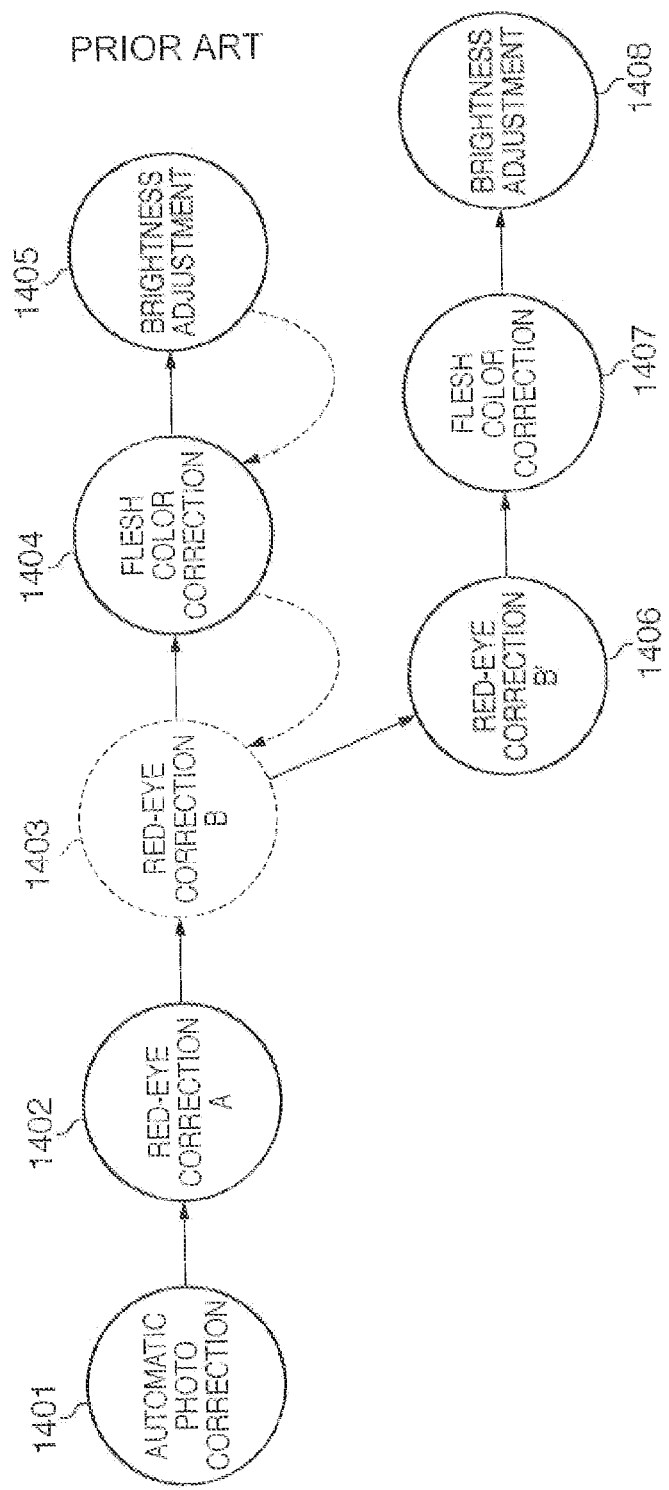
FIG. 14 is a view for explaining a conventional undo/redo function.

For example, assume that the user wants to change red-eye correction B 1403 after executing automatic photo correction 1401, red-eye correction A 1402, red-eye correction B 1403, flesh color correction 1404, and brightness adjustment 1405 in FIG. 14. Conventionally, the user presses an undo button U1302 in FIG. 13 twice. Then, new red-eye correction B' 1406 is executed. After that, the user presses a flesh color correction button such as an automatic correction button U1305 once. Finally, the user adjusts a brightness adjustment slider such as a slider U1306. The user can obtain a desired result by performing these processes.

In this embodiment, however, to obtain the same result as before, the user presses a red-eye correction undo button such as the undo button U604 in FIG. 6. After that, the user need only execute new red-eye correction B'.

As described above, in this embodiment, it is possible to obtain a desired result by a much smaller number of operations as compared to the prior art.

[Modification]

Figure 11:
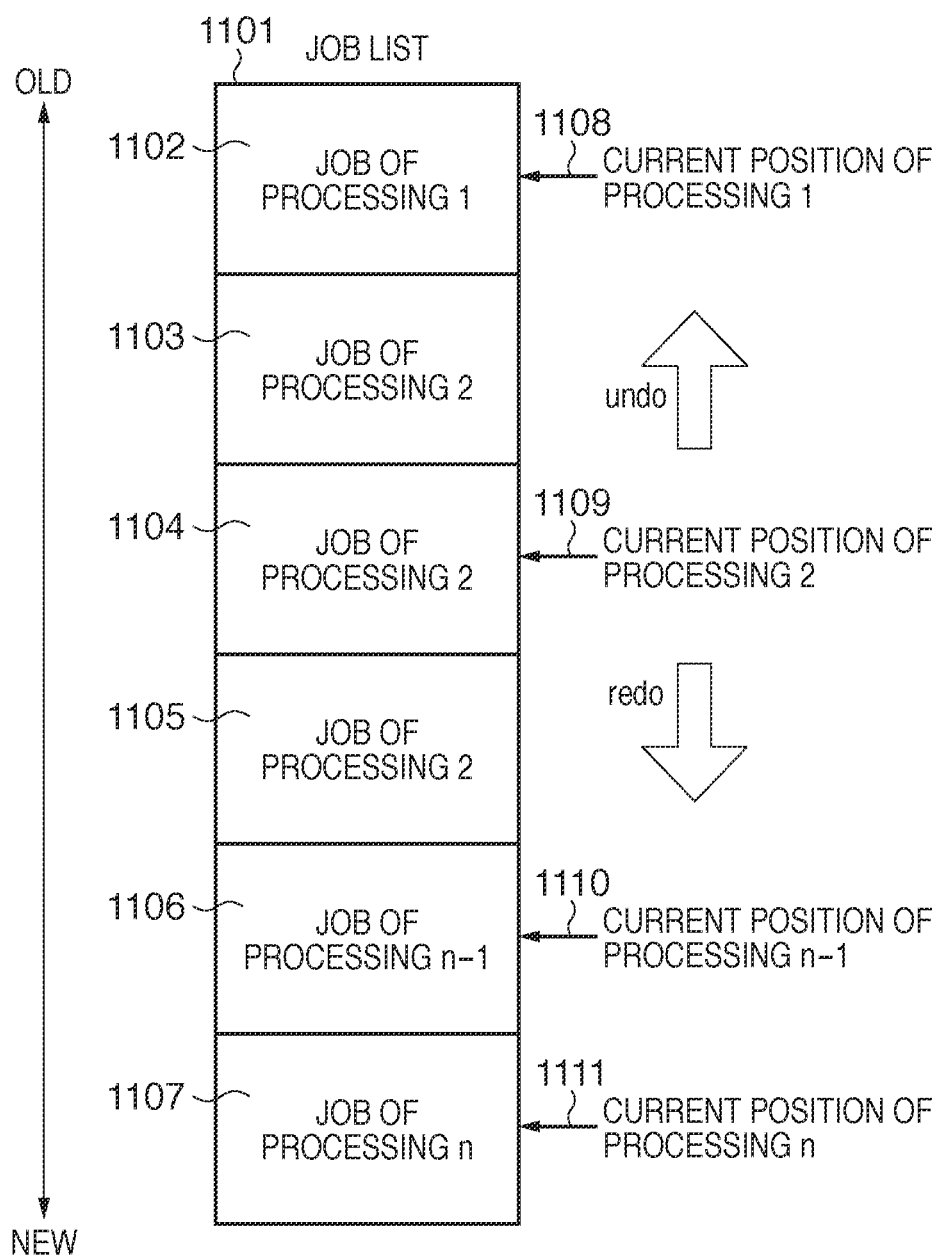
FIG. 11 is a view for explaining an example of job management and an example of current position management according to a modification of the first embodiment.

In the above-described embodiment, job management is done using a two-dimensional array including a job list for each process function. This is merely an example, and any other method is usable. For example, as shown in FIG. 11, only one one-dimensional job list 1101 may be held, and current position pointers 1108 to 1111 may be held for respective process functions to manage the jobs. In this case, addition of a new job can be implemented by adding it to the new side of the job list 1101. The undo/redo function can be implemented by moving a current position pointer of a process function to be undone/redone only on the jobs of the same type of process function. Image processing execution can be implemented by scanning the jobs 1102 to 1107 of the job list in chronological order for each process function and executing the jobs based on the position of the current position pointer of the process target process function. In full processing, the job indicated by the current position pointer is executed. In local processing, the jobs of the process target process function are executed from the order one up to the job indicated by the current position pointer.

In this embodiment, the job current position management unit 205 is provided. However, the job management unit 203 may manage the current position pointer, too. For example, the jobs may be managed by adding a flag to be used to determine the job corresponding to the current position upon job management. To undo, the flag of the job of the current position is cleared, and the flag of the immediately preceding job is set. To redo, the flag of the job of the current position is cleared, and the flag of the immediately succeeding job is set.

As described above, the essence of the embodiment is to manage jobs by preparing the current position pointer for each process function. Whether the job list format is two- or one-dimensional is not essential.

Second Embodiment

In the first embodiment, a job which causes an error upon executing image processing is also registered in the main job list 501. For this reason, if a job that causes an error is registered, the error occurs every time image processing is executed. An error that occurs upon executing image processing is an error that occurs when, for example, the outside of an image is selected, or the correction degree is set to an unexpected value.

In this embodiment, to solve the above-described problem, a job which causes an error upon executing processing is registered not immediately in the job list but temporarily in a temporary list, in addition to the first embodiment.

Figure 7:
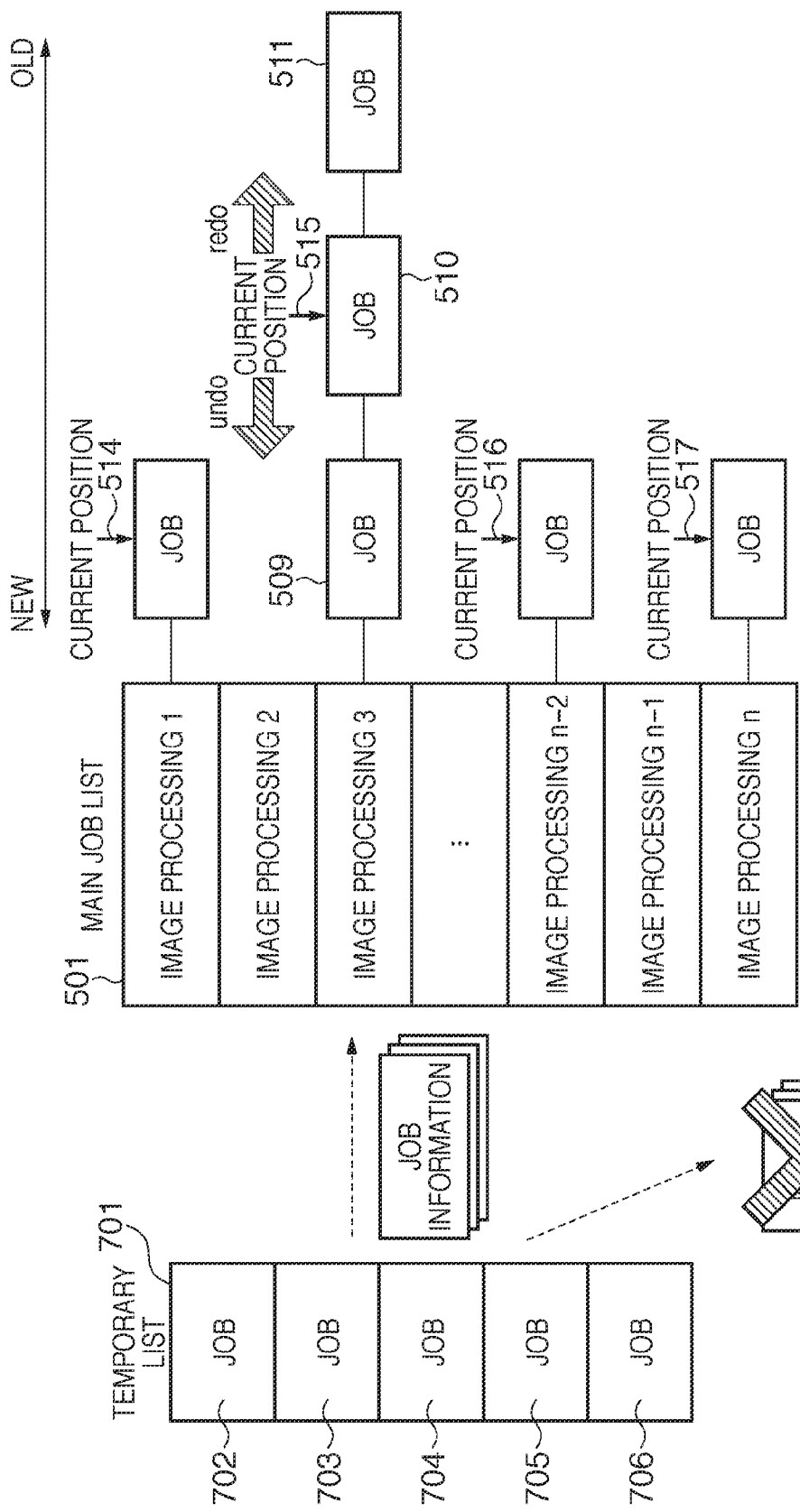
FIG. 7 is a view for explaining an example of job management and an example of current position management according to the second embodiment.

For example, a temporary list 701 shown in FIG. 7, which temporarily stores jobs before execution, is provided in a job management unit 203 in FIG. 2. In FIG. 7, the temporary list 701 contains jobs 702 to 706. When adding a new job in accordance with a new job addition instruction, the job management unit 203 first stores the new job in the temporary list 701. After that, if no error has occurred upon executing image processing, the job is registered in a main job list 501. The main job list 501 is the same as the job list 501 shown in FIG. 5.

The operation for an undo/redo instruction is the same as in the first embodiment.

Figure 8:
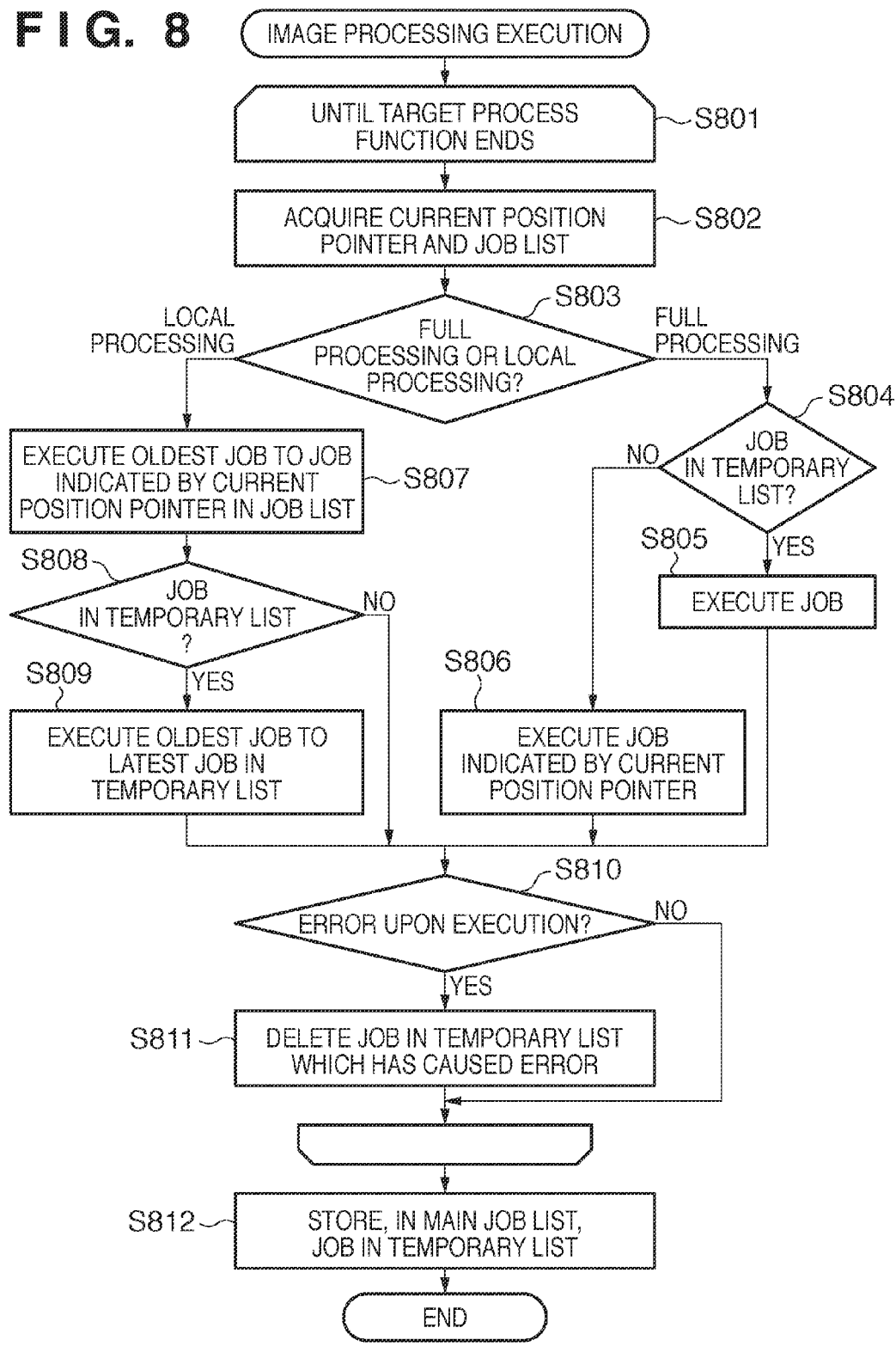
FIG. 8 is a flowchart of image processing execution according to the second embodiment.

For a processing execution instruction, the processing procedure in FIG. 8 is executed. Processing up to step S803 is the same as in the first embodiment. For full processing, the process advances to step S804 to determine whether the temporary list 701 includes a job of the process function of interest. If YES, the process advances to step S805 to execute the latest job in the temporary list 701 corresponding to the current target process function. If no job exists in the temporary list 701 in step S804, the process advances to step S806 to execute the job indicated by the current position pointer acquired in step S802. Note that after the execution, process result information, that is, information representing whether the processing has succeeded is recorded for each job.

For local processing, the process advances to step S807 to execute the oldest job up to the job indicated by the current position pointer in the job list acquired in step S802. After that, the process advances to step S808 to determine whether the temporary list 701 includes a job of the process function of interest. If YES, out of the jobs in the temporary list 701 corresponding to the current target process function, the oldest jobs up to the latest job are sequentially executed. In this case as well, process result information is recorded for each job.

The process advances to step S810. If an error has occurred upon executing the processing, the job in the temporary list 701, which has caused the error, is deleted. Processing of steps S802 to S811 described above is executed until the execution target process function ends. All process functions may be executed. Only a process function for which new job addition or current position pointer update has been performed may be executed. Alternatively, any other method is applicable.

Finally, the process advances to step S812 to move the jobs in the temporary list 701 to the main job list 501. Since the jobs that have caused errors do not exist in the temporary list 701, the main job list 501 can store only normal jobs.

The above-described procedure of steps S801 to S812 is merely an example. Alternatively, for example, every time a new job is registered, the job may temporarily be executed. After determining whether the job normally ends, a job that has normally ended may be registered in the job list. In the temporary execution, the image data after processing need not be stored. That is, before registering a new job in the job list, it is determined that the job causes no error upon execution, and the job is registered after that.

As described above, in this embodiment, since a job which has caused an error at the time of execution is never registered, error occurrence in the next execution can be suppressed. This embodiment is especially effective for an error which cannot be detected unless the allowable range of correction information such as the correction degree changes depending on the image upon execution.

Note that in this embodiment, only one area is allocated to temporarily store jobs. However, a plurality of areas may be allocated.

[Modification]

Figure 12:
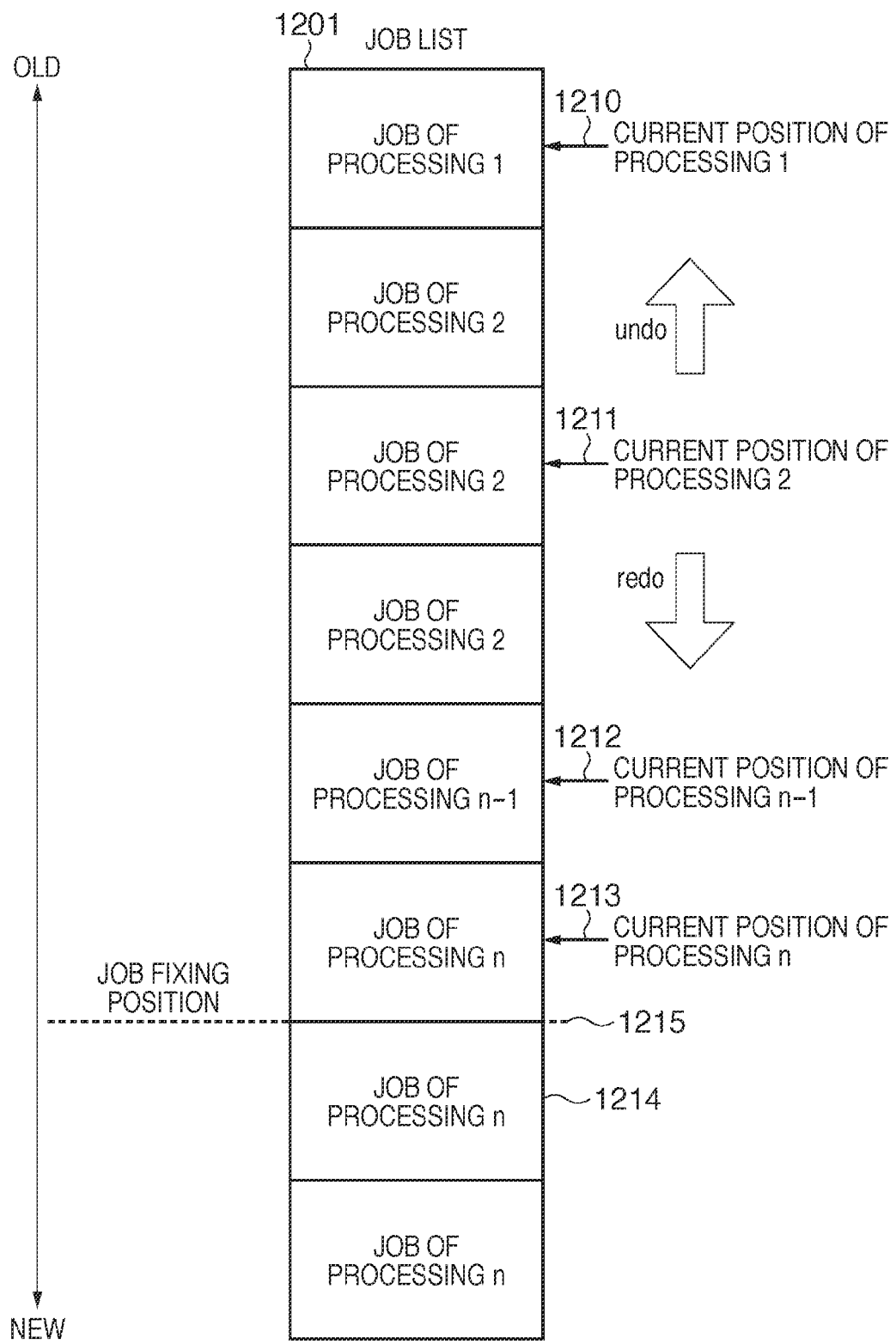
FIG. 12 is a view for explaining an example of job management and an example of current position management according to a modification of the second embodiment.

In this embodiment, a job list is held for each process function. However, this is merely an example, and any other method is usable. For example, a case will be described in which only one job list 1201 is held, and current position pointers 1210 to 1213 are held for respective process functions to manage the jobs, as shown in FIG. 12. In this case, the management can also be implemented by setting a position of determinate job 1215, as shown in FIG. 12, and distinguishing between a fixed job by which no error has occurred in execution and an unfixed job which has not executed.

Third Embodiment

In the second embodiment, when processing is performed following the user operation, unfixed jobs whose process contents are not fixed yet during the user's UI operation are also registered. For this reason, the unfixed jobs also undergo undo/redo, and the undo/redo operability degrades.

Figure 10:
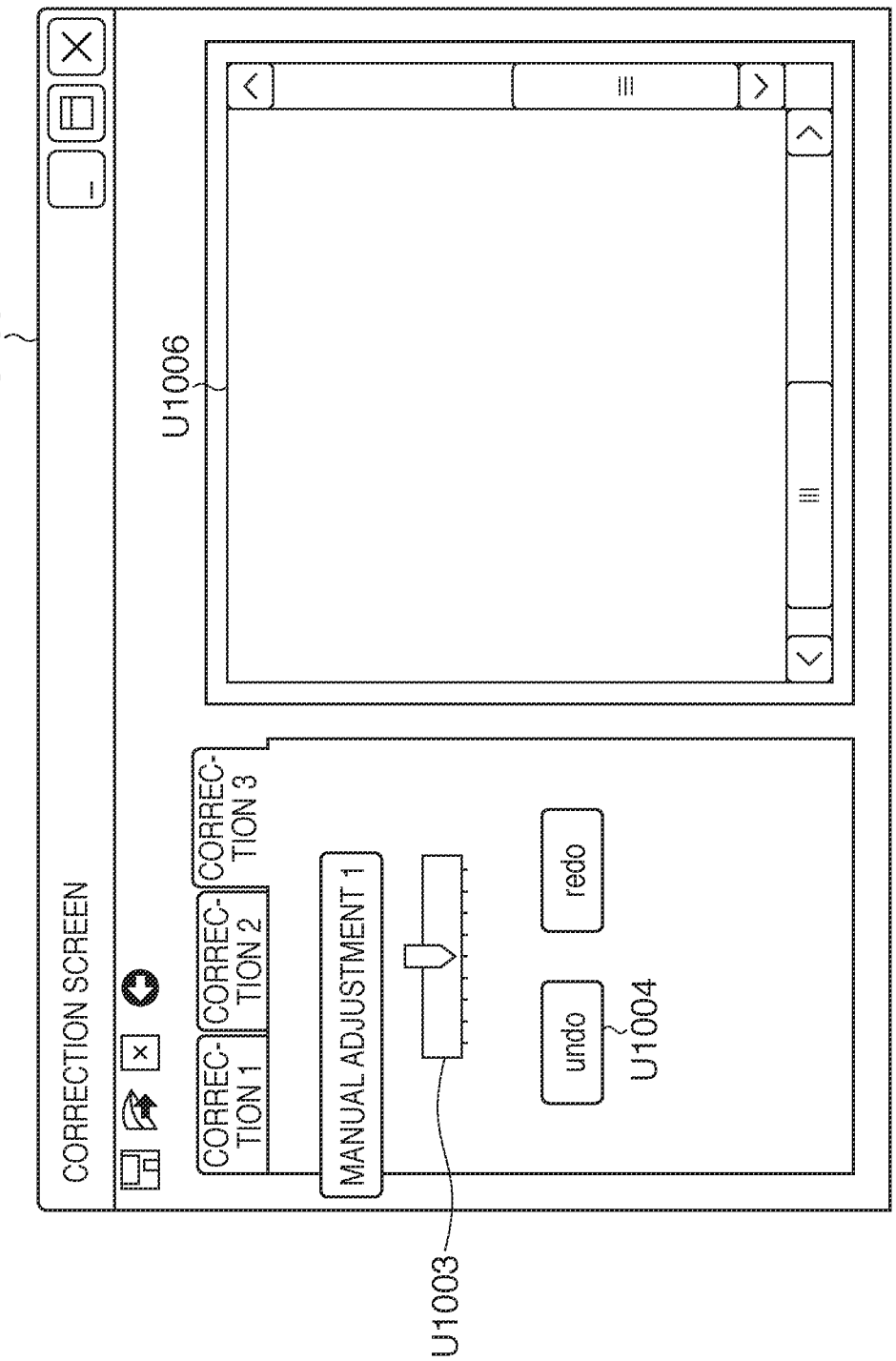
FIG. 10 is a view showing an example of a UI so as to explain an unfixed job according to the third embodiment.

For example, assume that image processing is to be reflected on the preview by moving a brightness adjustment bar such as a slider U1003 in a user interface U1001 shown in FIG. 10. In this case, every time the user moves the slider, image processing is performed, and a job is registered. For this reason, all motions of moving the slider become the target of the undo/redo operation. More specifically, a case in which brightness adjustment is performed while observing a preview will be described. The user moves the brightness adjustment bar through level 10→11→12→13, and ends the adjustment upon obtaining an expected result. At this time, the user needs only the job of level 13. The remaining jobs of levels 10, 11, and 12 during movement of the brightness adjustment bar are unnecessary. The above-described unfixed jobs indicate these unnecessary jobs of levels 10, 11, and 12. However, when returning the brightness to the initial value, the previous result is obtained only when the processing is undone four times through level 13→12→11→10 by pressing the undo button U1004 four times.

In this example, since the level has moved by only four values, only four undo operations suffice. However, for several ten processes, the operation is very cumbersome, and the undo/redo operability considerably degrades. In addition, a correction function to be executed as adjustment using a slider, for example, RGB adjustment or contrast adjustment is readily used to do correction by consecutively moving the slider, and this makes the problem more conspicuous.

In this embodiment, to solve the above-described problem, a means for determining whether a job is fixed is added to the second embodiment. If a job is determined as unfixed, it is not stored in the job list. An unfixed job indicates a job during a continuous UI operation by the user. In this case, the image processing module executes the job and displays a result following the user's UI operation. However, the job is not fixed by the user and therefore does not undergo undo/redo.

Assume that the operation during the continuous UI operation by the user is, for example, user's dragging the slider U1003 in FIG. 10 by the mouse pointer. In this case, image processing during pressing the cursor key is an unfixed job. For example, an operation during pressing a key of the keyboard is also unfixed. For example, an operation during dragging to select an image area in an image display region U1006 is also unfixed. An operation during rotation of the mouse wheel is also unfixed. An operation when the user is touching the touch panel is also unfixed. The above-described method is merely an example, and any other method is also possible.

Figure 9:
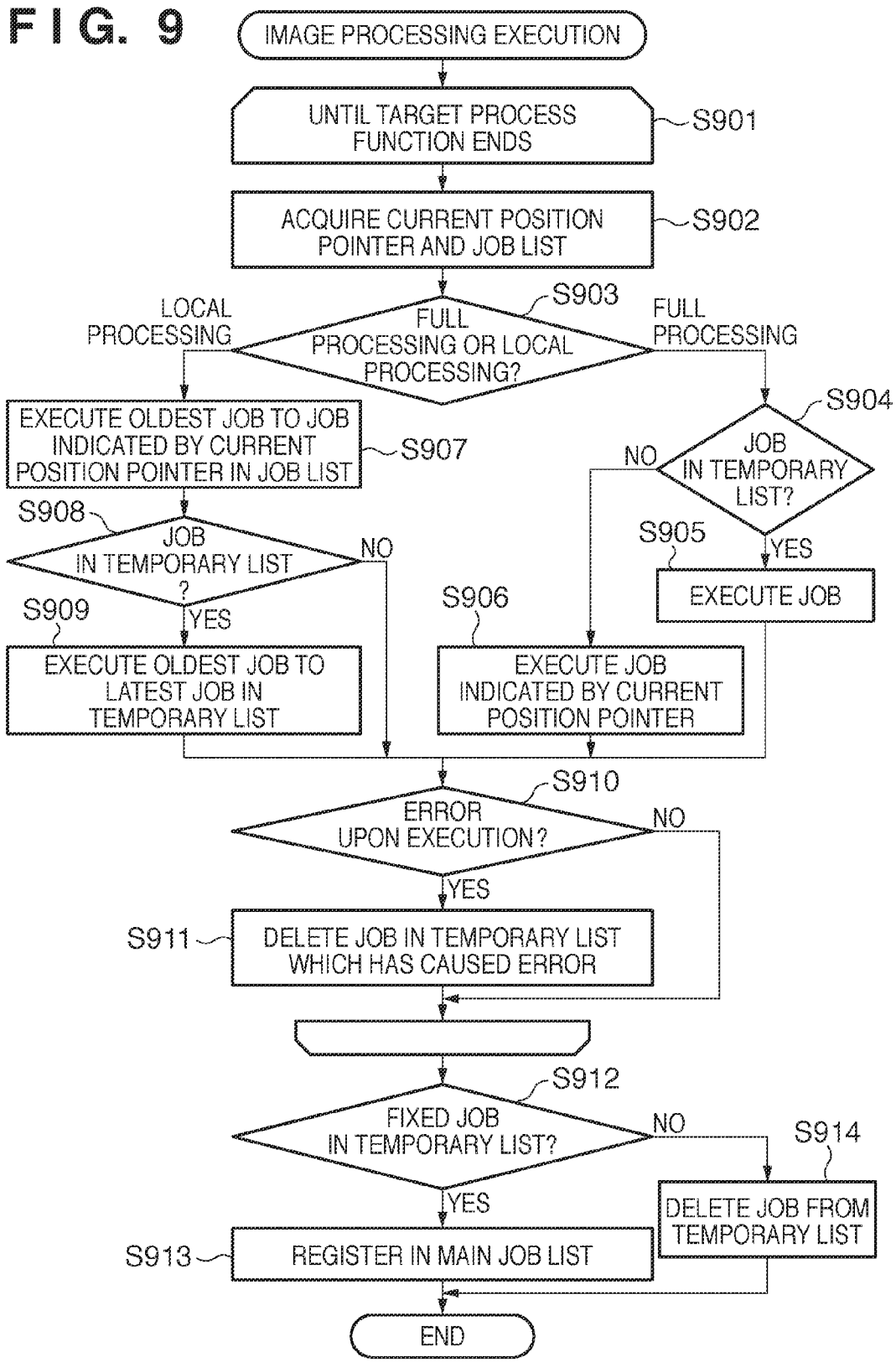
FIG. 9 is a flowchart of image processing execution according to the third embodiment.

FIG. 9 illustrates the processing procedure upon inputting a processing execution instruction. FIG. 9 shows a procedure based on the second embodiment. Processing of steps S901 to S911 is the same as processing of steps S801 to S811 in FIG. 8 of the second embodiment, and a description thereof will not be repeated. The process advances to step S912. If the job in the temporary list is fixed, the process advances to step S913 to store, in a main job list 501, the job stored in the temporary list. If the job is unfixed, the process advances to step S914 to delete the job from the temporary list. Whether the job is fixed can be determined in the above-described manner. That is, each user operation is determined in accordance with the above-described criterion. The above-described method in steps S901 to S914 is merely an example, and any other method is also possible.

[Modification]

Note that to determine whether a job is fixed, a fixing button may newly be provided to fix a job in accordance with a user instruction. In this case, a fixing button can be adopted based on the first embodiment. In the first embodiment, pressing the image processing button or a slider operation inputs a new job addition instruction. In this modification, after an image processing operation such as pressing the image processing button or a slider operation, an image processing addition instruction based on the instruction is issued only when the user presses the fixing button. The fixing button may be pressed to fix a plurality of image processing operations in a lump. Alternatively, fixing may be required for each image processing, and otherwise, another image processing may be prohibited. This arrangement obviates the need for temporary job registration. For this reason, no temporary list need be used, unlike the second embodiment. The method is also applicable to the first embodiment.

As described above, in this embodiment, the means for determining a fixed job and an unfixed job is added. Since no extra job is added, the above-described problem is solved, and the undo/redo operability improves.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-118772, filed May 24, 2010, which is hereby incorporated by reference herein in its entirety.

What is claimed is:

1. An image processing apparatus, comprising:
an input unit configured to input respective instructions of different image processings for an image;
a registration unit configured to associate process information of the different image processings with a corresponding processing function, and register the process information for each processing function using a pointer in chronological order of the instructions being input by the input unit;
a processing unit configured to execute image processing for the image in accordance with an instruction of image processing input by the input unit; and
an execution unit configured to
select a target processing function from among processing functions associated with the process information of the different image processings,
execute the image processing of the target processing function by using the process information currently pointed to by the pointer registered by the registration unit if the target processing function is full processing that is applied to an entire image, and
execute the image processing of the target processing function by using process information comprising i) the process information currently pointed to by the pointer, and ii) the process information of the image processings whose instructions were input in the chronological order between the earliest input instructions and the instruction for the image processing whose processing information is currently pointed to by the pointer, registered by the registration unit, if the target processing function is local processing that is applied to part of the image.

2. The apparatus according to claim 1, further comprising a selection unit configured to select the processing information in accordance with an undo or redo operation for the target processing function if a plurality of pieces of processing information, each of which is associated with an instruction, corresponding to a plurality of instructions, has been registered by the registration unit.

3. The apparatus according to claim 1, wherein the full processing includes brightness adjustment and/or contrast adjustment.

4. The apparatus according to claim 1, wherein the local processing includes red-eye correction and/or mole removal.

5. An image processing method, comprising:
inputting respective instructions of different image processings for an image;
associating process information of the different image processings with a corresponding processing function, and registering the process information for each processing function using a pointer in chronological order of the instructions being input in the inputting step;
executing image processing for the image in accordance with an instruction of image processing input in the inputting step;
selecting a target processing function from among processing functions associated with the process information of the different image processings;
executing the image processing of the target processing function by using the process information currently pointed to by the pointer registered by the registering step if the target processing function is full processing that is applied to an entire image; and
executing the image processing of the target processing function by using process information comprising i) the process information currently pointed to by the pointer, and ii) the process information of the image processings whose instructions were input in the chronological order between the earliest input instructions and the instruction for the image processing whose processing information is currently pointed to by the pointer, registered by the registration step, if the target processing function is local processing that is applied to part of the image.

6. A non-transitory computer readable medium in which a program is provided for causing a computer to perform an image processing method, the method comprising:
inputting respective instructions of different image processings for an image;
associating process information of the different image processings with a corresponding processing function, and registering the process information for each processing function using a pointer in chronological order of the instructions being input in the inputting step;
executing image processing for the image in accordance with an instruction of image processing input in the inputting step;
selecting a target processing function from among processing functions associated with the process information of the different image processings;
executing the image processing of the target processing function by using the process information currently pointed to by the pointer registered by the registering step if the target processing function is full processing that is applied to an entire image; and
executing the image processing of the target processing function by using process information comprising i) the process information currently pointed to by the pointer, and ii) the process information of the image processings whose instructions were input in the chronological order between the earliest input instructions and the instruction for the image processing whose processing information is currently pointed to by the pointer, registered by the step, if the target processing function is local processing that is applied to part of the image.

* * * * *